(12) United States Patent
Church

(10) Patent No.: US 7,007,984 B2
(45) Date of Patent: Mar. 7, 2006

(54) HANG-FREE THREAD DESIGN

(75) Inventor: Kris L. Church, Montgomery, TX (US)

(73) Assignee: Torquelock Corporation, Conroe, TX (US)

( * ) Notice: Subject to any disclaimer, the term of this patent is extended or adjusted under 35 U.S.C. 154(b) by 101 days.

(21) Appl. No.: 10/301,079

(22) Filed: Nov. 21, 2002

(65) Prior Publication Data
US 2004/0100098 A1 May 27, 2004

(51) Int. Cl.
F16L 15/00 (2006.01)
(52) U.S. Cl. .................. 285/333; 285/334; 285/390
(58) Field of Classification Search ............ 285/333, 285/334, 355, 390
See application file for complete search history.

(56) References Cited

U.S. PATENT DOCUMENTS

| 3,454,070 A | * | 7/1969 | Phipard, Jr. ............ 411/168 |
| 4,398,756 A | * | 8/1983 | Duret et al. ............ 285/334 |
| 4,537,429 A | * | 8/1985 | Landriault ............. 285/334 |
| 4,822,081 A | * | 4/1989 | Blose ................. 285/334 |
| 4,973,209 A | * | 11/1990 | Essom et al. .......... 411/386 |
| RE34,467 E | * | 12/1993 | Reeves .............. 285/334 |
| 5,415,442 A | * | 5/1995 | Klementich ........... 285/331 |
| 6,123,368 A | * | 9/2000 | Enderle ............. 285/334 |
| 6,158,785 A | * | 12/2000 | Beaulier et al. ......... 285/334 |
| 6,206,436 B1 | | 3/2001 | Mallis |
| 6,254,146 B1 | | 7/2001 | Church |
| 6,270,127 B1 | * | 8/2001 | Enderle ............. 285/334 |
| 6,572,315 B1 | * | 6/2003 | Reed ............... 411/307 |
| 6,578,880 B1 | * | 6/2003 | Watts .............. 285/334 |
| 2002/0131839 A1 | * | 9/2002 | Kondo et al. .......... 411/308 |

* cited by examiner

Primary Examiner—James M. Hewitt
(74) Attorney, Agent, or Firm—C. James Bushman; Browning Bushman P.C.

(57) ABSTRACT

A threaded pin and box connection having thread geometries and/or dissimilar thread fits that prevent the pin thread of a connection from hanging up in the box thread as the pin is being stabbed into or destabbed from the box. Dissimilar geometries and/or threads include dissimilar thread types, dissimilar leads, overlapping leads, thread tooth widths of one component greater than thread grooves of the other component, multiple start threads, and combinations thereof.

30 Claims, 6 Drawing Sheets

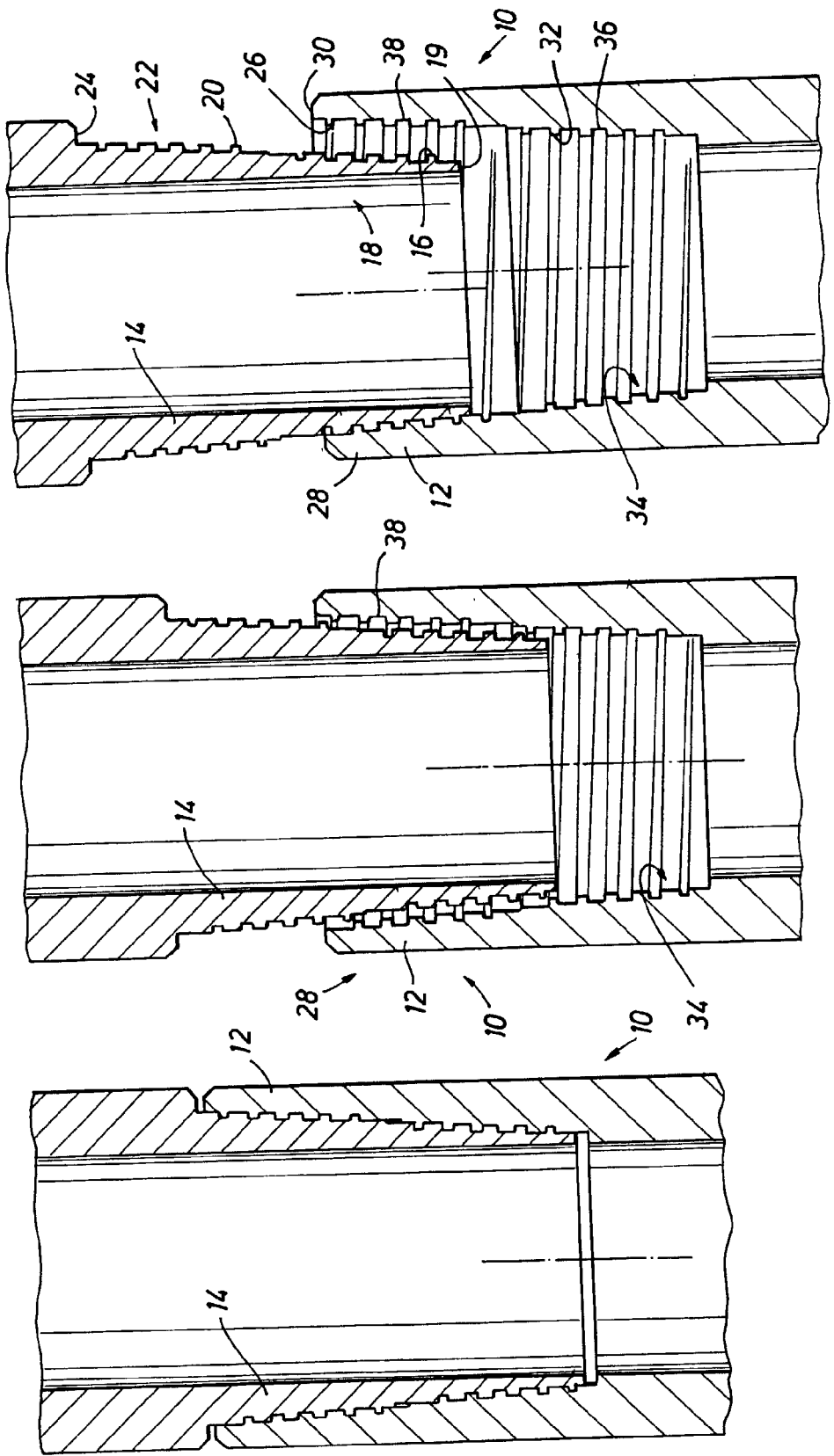

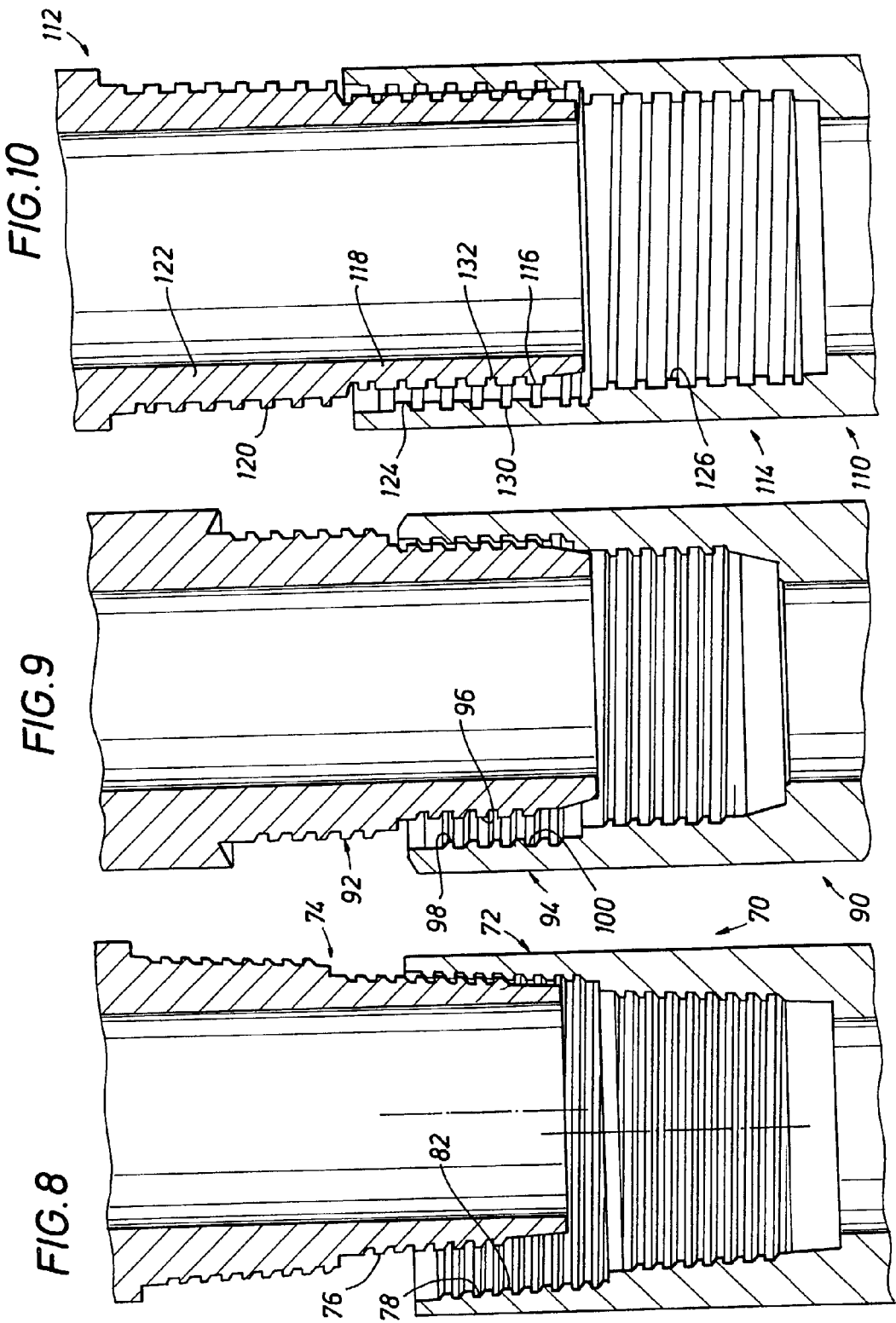

HANG-FREE THREAD DESIGN

BACKGROUND OF THE INVENTION

1. Field of the Invention

The present invention relates generally to threaded connections used in securing two components together. More specifically, the present invention relates to a threaded pin and box connector for assembling tubular pipe bodies to each other.

2. Background Setting of the Invention

The pipe used in the construction of wells is usually in the form of a long tubular string assembled from a number of small pipe sections. The pipe can be used as a drill string, a casing or tubing string, a tendon for offshore rig anchoring or other applications requiring connection together of individual threaded components. The pipe sections are secured together at their ends by an externally threaded connector, or "pin" that is threadedly received within an internally threaded connector or "box". Each pipe section has a pin on one pipe end and a box at the opposite pipe end. Some pipe has an internally threaded coupling secured to one end of a double pin pipe section to produce the box. The individual pipe sections are frequently referred to as a "pipe joint". Tubing and casing pipe joints are usually 30 ft. in length. Casing pipe joints typically vary in length from 20 ft. to 40 ft. or longer.

The various pipe strings used in constructing a well are usually assembled on the floor of a drilling or workover rig. The pipe string is lengthened and lowered into the well as succeeding pipe joints are added to the string. During this assembly procedure, the pipe joint being added to the string is lowered, pin down, into an upwardly facing box projecting from the drilling rig floor. This procedure is commonly referred to as "stabbing" the pin into the box. After being stabbed, the added pipe joint is rotated to engage the threads of the pin and box, securing the joint to the string.

In disassembling a string, the previously described process is reversed. The pipe joint at the top of the string is rotated to disengage the pin and box threads. Once the threads have disengaged, the pin is lifted out of the upwardly facing box projecting from the rig floor. This procedure is sometimes referred to as "destabbing" the pin from the box. Once free of the box, the removed joint is moved to a storage location.

Thread damage can occur if the pin is not cleanly stabbed into the box of the connection. If there is misalignment between the pin and box as the joint is lowered into engagement with the box, the face and side of the pin can strike seals and threads in the box causing damage to both components of the connection. The use of a stabbing guide when a joint is being added to the string minimizes stabbing damage. The stabbing guide centralizes the pin over the box and prevents the pin from striking the box threads or seals as the pin is being stabbed into the box.

A problem with disassembling certain threaded pipe strings is that the pin and box threads can hang on each other when the pipe joints are being destabbed after having been unthreaded from each other. A hang-up of the pin and box threads during destabbing can seriously damage both components of the threaded connection and can also cause inadvertent release and dropping of the entire pipe string or injury to personnel.

The probability of a hang-up is increased in multi-step thread forms where the threads are machined on adjoining cylindrical surfaces having dissimilar diameters. A multi-step thread design is beneficial in that it permits a threaded pin to be stabbed deeply into a threaded box without relative rotation between the two pipe joints. Once the pin is stabbed, threaded engagement of multi-step pin and box threads is effected by a relatively few number of turns of the pin into the box. By contrast, full makeup of non-tapering single step connections requires that the pin and box threads be rotated relative to each other a number of revolutions that equals the number of connection thread revolutions.

Certain two-step drill pipe connections currently used in prior art designs employ a two-step wedge thread. A two-step thread design that employs a wedge thread is particularly susceptible to hang-up during stabbing and destabbing of the connection. The increased susceptibility results from the fact that the wedge thread tooth changes in width over its length so that a relatively narrow pin thread can come into registry with relatively broad spacing between adjacent box thread teeth during stabbing and destabbing. If the centerline of the pin is displaced from the centerline of the box during the stabbing and destabbing motion, the threads near the end of the pin will hang-up in the threads near the face of the box. When the threads hang-up during destabbing, it is necessary to slightly lower the joint, center the pin within the box and then lift the pin free of the box. If large forces are exerted on threads after they have hung up, serious damage may be done to the threads of the pin and box.

The special care required to prevent hanging up of the threads when a drill string is being laid down or placed back in the derrick is time consuming and can unacceptably extend the time required to pull the drill string from the well. The designers of the prior art wedge thread drill pipe address the problem by providing a centralizing destabbing guide that can be placed over the connection before the unscrewed pin is lifted out of the box. Proper placement of the destabbing guide around the connection requires additional personnel effort and extends the time required to remove the pipe string from the well. Moreover, the centralizing guide may not be effective in maintaining centralization of the pin and box under certain conditions such as occur, for example, when a strong side wind is present or when the drilling rig top drive or block is not properly centered over the drill string box.

Constructing the thread diameters of two-step connections with as large a difference in diameters as possible reduces the probability of thread hang-up during stabbing and destabbing. This design tactic permits greater centerline displacement to occur between the pin and box before the thread teeth on the side of the pin engage the thread teeth on the inside of the box. However, in order to achieve this reduction in hang-up without weakening the connection, the external dimensions of the connector must be increased and/or the internal passage through the connector must be decreased. Good string design dictates that the external and internal diameters of a threaded connector be maintained as closely as possible to the external and internal diameters, respectively, of the pipe bodies being secured together by the connector. Extending the outside diameter of a connector or reducing the internal clearance through the connector to minimize the incidence of thread hang-up on stabbing or destabbing compromises optimum connection design.

SUMMARY OF THE INVENTION

The present invention solves the problem of thread hang-up by providing connection geometries such as thread forms, dimensions, and/or dissimilar thread fits that prevent lateral entry of the pin thread tooth into the gap formed between adjacent turns of the box thread tooth during all, or virtually all, times when the box threads overlap the pin threads as the pin is being stabbed into, or destabbed from, the box.

In a preferred form of the Invention, the crest of the pin thread tooth at the end of the pin is larger than the width of the spacing, or thread groove, between adjacent turns of the box thread tooth at the end of the box. The wider dimension of the pin thread tooth prevents the pin thread tooth from entering the smaller dimension of the opening between adjacent turns of the box thread tooth.

In the design of the present invention, the smaller width pin thread tooth is never in radial registry with the larger width box thread groove, which prevents the pin and box threads from hanging up in each other. In prior art designs subject to hang-up, narrow pin thread teeth are in registry with the larger diameter box thread grooves during the stabbing and destabbing procedure.

The thread design of the present invention permits the use of a multi-step thread form without regard to problems associated with thread hang-up. As a result, all of the benefits of a multi-step connection can be obtained without undesirably increasing the external dimensions of the connection or diminishing the connection strength.

The design of the invention provides additional safety in pipe handling by preventing accidental release and dropping of the string into the well following a hang up during removal of pipe sections from the string.

A multi-step thread form in a drill pipe connection, using the design of the present invention, enables the wall of the engaged connection to be reduced significantly, which increases the flexibility of the connection, reduces the incidence of fatigue failure in the connection, provides a larger central internal diameter for fluid passage through the connection and enables the formation of the threads on a reduced size upset at the end of the pipe.

The thread design of the present invention can be incorporated in virtually any thread form, including, but not limited to V, tapered, square, round, hooked, dovetail, wedge, Chevron, semi-dovetail, multi faceted and combinations of these thread forms.

A novel feature of the thread form of the present invention is the provision of a multi-step pin thread in which the width of the crest of a helical pin thread tooth is greater in the threaded step adjacent the end of the pin than it is in the step removed from the end of the pin.

In a modified form of the present invention applied to a multi-step wedge thread, the lead of the large step box thread is made to differ from the lead of the small step pin thread so that the crest of the pin thread tooth spans the gap between the crest of adjacent turns of the box thread tooth during stabbing and destabbing, thereby preventing entry of the pin thread tooth into the groove or gap between adjacent turns of the mating box component. The load flank lead of the box thread is made smaller than the load flank lead of the pin thread while the stab flank lead of the box thread is made greater than the stab flank lead of the pin thread. The average lead of the pin thread is the same as the average lead of the box thread, enabling the connection to be screwed together. The potential area for hang-up in a wedge thread with dissimilar leads is limited to a small part of the total thread area near the axial end of the pin connection and the face of the box connection.

The no-hang feature of the present invention enables the construction of a threaded connector on a pipe joint having a smaller upset than is required for the construction of a conventional connector using a similar thread. Significant cost savings may be effected in the manufacture of a, pipe string of the present invention because of the higher costs associated with the fabrication of the larger pipe upsets required for the construction of conventional connectors.

The ability to make the composite wall of a connector of the present invention thinner than that of a conventional connector using the same or equivalent threads increases the efficiency of fluid transfer through the connection, contributes to a reduction in fatigue failures of the connection, permits the use of a string using the connector in more highly deviated wells, and enables fabrication of the connector on a smaller pipe upset. All these features improve the performance of the pipe string and contribute to a reduction in the cost of manufacturing and using the pipe string.

From the foregoing, it may be appreciated that an important object of the present invention is to provide a thread construction that prevents thread hang-up during stabbing or destabbing of a threaded connection.

Another object of the present invention is to provide a thread construction for a multi-step thread connection in which the thread diameters of the various threaded step areas may be made as close in size to each other as possible without regard to the probability of thread hang-up.

An object of the present invention is to provide a thread construction that can be applied to a variety of different thread types for preventing thread hang-up during stabbing and destabbing of connections.

An object of the present invention is to provide a non-hanging thread construction that permits the construction of a drill pipe string that is more flexible than that of a similar drill pipe string with threads that can hang-up during stabbing or destabbing.

It is also an object of the present invention to provide a non-hanging thread form that permits the construction of a string of pipe with smaller connection dimensions than those of prior art pipe strings.

Yet another object of the present invention is to provide a thread design in which the thread tooth width exceeds the box thread groove width at every axial position where a pin thread and box thread are adjacent each other during stabbing or destabbing of the pin and box.

Another object of the present invention is to provide a multi-step threaded connection in which threads in a first step adjacent the free end of the connection have a width that is greater than the width of the threads on a second step further removed from the connection end.

It is also an object of the present invention to provide mating pin and box thread forms that are dimensioned and positioned to cause the pin threads to span the grooves between adjacent turns of the box threads during stabbing and destabbing to thereby prevent hanging of the pin threads in the box thread grooves.

A specific object of the present invention is to provide a pin and box connection having wedge threads wherein the lead of the pin threads and box threads are dissimilar while the average pin and box thread leads are maintained equal to each other to thereby permit the connection to be screwed together while simultaneously preventing hang-up during stabbing and destabbing.

The foregoing objects, features and advantages of the thread design and method of the present invention will be better understood and more fully appreciated by reference to the following drawings, specification and claims.

BRIEF DESCRIPTION OF THE DRAWINGS

FIG. 1 is a vertical cross sectional view of an engaged pin and box connection of the prior art having a semi-dovetail, wedge helix thread profile;

FIG. 2 is a vertical cross sectional view of the prior art connection of FIG. 1 illustrated following disengagement of the threads, before destabbing the pin from the box;

FIG. 3 is a vertical cross sectional view of the prior art connection of FIGS. 1 and 2 illustrated with the pin and box threads hanging up as the pin is being destabbed from the box;

FIG. 8 is a vertical cross sectional view of a non-wedge, hooked thread pin connection of the present invention being destabbed from a mating box connection without hanging up of the threads;

FIG. 9 is a vertical cross sectional view of a positive flank thread, non-wedge pin connection of the present invention being destabbed from a mating box connection without hanging up of the threads;

FIG. 10 is a vertical cross sectional view of multi-faceted, dove tail wedge thread pin connection being destabbed from a box connection without hanging up of the pin and box threads;

DESCRIPTION OF THE ILLUSTRATED EMBODIMENTS

Figure 7:
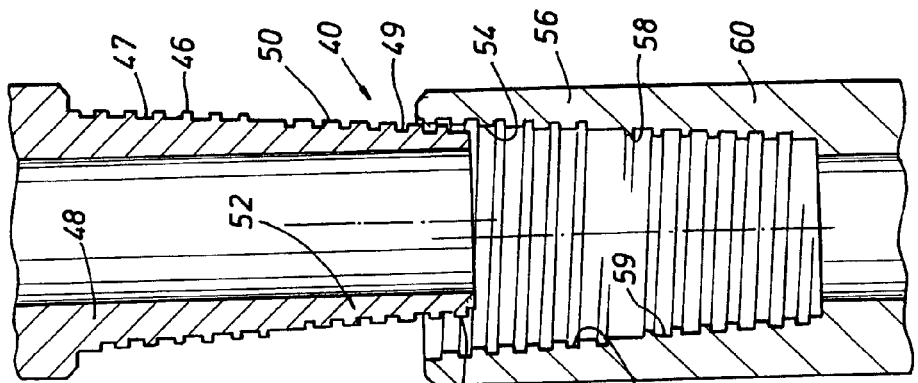
FIG. 7 is a vertical cross sectional view of the pin and box connection of FIGS. 4, 5 and 6 illustrated with the pin and box threads engaging without hanging up at the end of the destabbing process.

FIGS. 1–3 illustrate a conventional, prior art drill pipe connection, indicated generally at 10, in sequential stages of disassembly. For purposes of clarity, only the cross sectional thread profile is illustrated in the Figures. The connection 10 is provided with a box 12 and a pin 14 having two-step threads in the form of a mating semi-dovetail, wedge helix.

A first helical pin thread tooth 16 is machined on the threaded area 18 of a first thread step, nearest a pin end 19. A second pin thread tooth 20 is machined helically on the threaded area 22 of a second thread step nearest an external pin shoulder 24. The thread tooth 16 is a wedge thread that increases in width as it advances helically from a point nearest the pin end 19 toward the pin shoulder 24. The pin thread 20 is also a wedge thread that increases in width as it advances helically toward the pin shoulder 24.

The load flanks of the pin and box thread teeth are angled relative to the central axis of the pin and box 20 to form a semi-dovetail engagement. When the connection 10 is fully made up, the load flank of the box thread tooth confines the load flank of the pin thread tooth radially. In the made up position, the wedge shaped pin thread teeth are tightly engaged within the wedge-shaped groove formed between the adjacent box thread teeth.

A first helical box thread tooth 26 is machined on the thread area 28 of a first box thread step, nearest a face 30 of the box 12. A second box thread tooth 32 is machined helically on the threaded area 34 of a second thread step extending away from the face 30. The thread teeth 26 and 32 are wedge threads that increase in width as they advance helically away from the box face 30.

When the pin 14 and box 12 of the connection 10 are assembled as illustrated in FIG. 1, the pin thread tooth 16 is received within a thread gap 36 created between adjacent helical turns of the box thread tooth 32. Simultaneously, the pin thread tooth 20 is received in a thread groove 38 created between adjacent helical turns of the box thread tooth 26.

In assembling the prior art connections illustrated in FIGS. 1–3, a centralizing stabbing guide (not illustrated) is placed over the face 30 of the box 12 and the pin 14 is stabbed into the box 12 until it reaches the position illustrated in FIG. 2. At the end of the stabbing movement, the pin thread tooth 16 on the small pin step 18 strikes the first box thread tooth 32 on the small box step 34. This interference of the threads in the pin and box prevents further axial downward movement of the pin into the box. After the pin is stabbed into the box, the stabbing guide is removed. The pin 14 is then rotated clockwise to advance the pin thread teeth into the grooves between the box thread teeth moving the pin into the position illustrated in FIG. 1. As characteristically occurs with wedge threads, the clockwise rotation is resisted as the pin thread teeth are wedged into the grooves between the box thread teeth.

As best illustrated in FIG. 3, failure to employ a stabbing guide during the stabbing of the two step threaded pin 14 into the box 12 can allow the pin to move eccentrically relative to the box which in turn permits the small width pin thread teeth to hang-up in the larger groove spacings between the box thread teeth. A related, but more problematic, situation occurs when separating the pin 14 from the box 12. During this process, it is necessary to employ a destabbing guide (not illustrated) to maintain coaxial alignment between the pin and box as the pin is being lifted out of the box to prevent the hang-up illustrated in FIG. 3.

Figure 5:
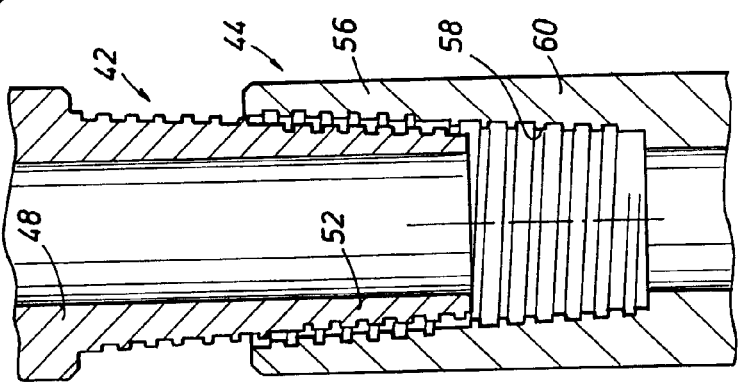
FIG. 5 is a vertical cross sectional view of the pin and box connection of FIG. 4 following disengagement of the pin and box threads, before destabbing the pin from the box.
Figure 4:
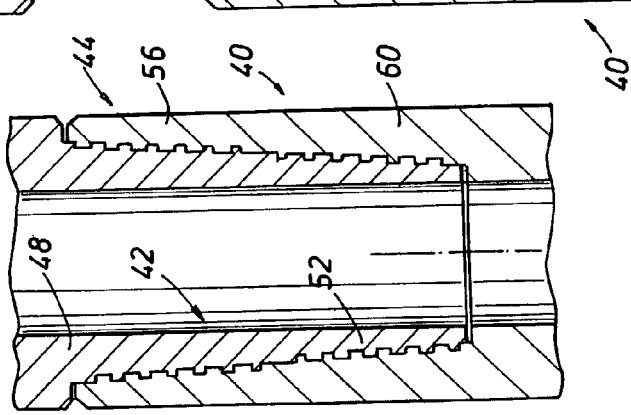
FIG. 4 is a vertical cross sectional view of an engaged pin and box connection of the present invention having a semi-dovetail wedge helix thread profile.

FIGS. 4–7 of the Drawings illustrate a hang-free threaded connector of the present invention, indicated generally at 40. The connector 40 is provided with a semi-dovetail thread profile having the wedge helix, such as that described in the prior art of FIGS. 1–3, equipped with the thread hang-up prevention feature of the present invention. FIG. 4 illustrates the connection 40 fully made up with the various tapering width wedge thread teeth firmly lodged in the mating tapering spaces between adjacent turns of the wedge thread teeth. FIG. 5 illustrates the connection 40 immediately following stabbing or immediately preceding destabbing of the pin and box.

The connector 40 includes a pin section indicated generally at 42 and a box section indicated generally at 44. The pin 42 equipped with a wedge thread tooth 46 on a large step section 48 and a second thread tooth 50 on a small step section 52. Gaps or thread root openings or grooves 47 and 49 are formed between adjacent rounds of the thread teeth 46 and 50, respectively. The box 44 is equipped with a wedge thread tooth 54 formed on a large step internally threaded section 56 and a second wedge thread tooth 58 formed on a smaller step section 60. Gaps 57 and 59 are formed between the thread teeth 54 and 58, respectively.

While the present description is described with reference to thread teeth hanging up in thread gaps, it will be appreciated that each thread tooth may be defined as the structure between adjacent thread gaps. Accordingly, thread hang-up is a possibility when the gap dimension between adjacent thread turns is greater than the structure dimension defined between succeeding gaps in the threads of the mating components. Thread hang-up may occur when the radial alignment of pin and box threads is such that the pin thread tooth is smaller than the gap between adjacent box thread teeth or, when the gap between adjacent pin thread teeth is greater than the box thread tooth width.

It will be appreciated that the connection 40 is a multi-step threaded connection having large step sections 48 and 56 and small step sections 52 and 60. The thread tooth 50 on the first step 52 adjacent the free end of the pin connection 42 has a width that is greater than the width of the thread tooth 46 on the second step 48 further removed from the connection end. Similarly, the thread tooth 54 on the large step adjacent the box end has a width that is greater than the width of the thread tooth 58 on the small section 60 further removed from the connection end.

An important feature of the present invention is that any single pin thread tooth width over the length of the small pin step 52 is greater than any opening or groove between adjacent thread teeth in the large box step 56.

Figure 6:
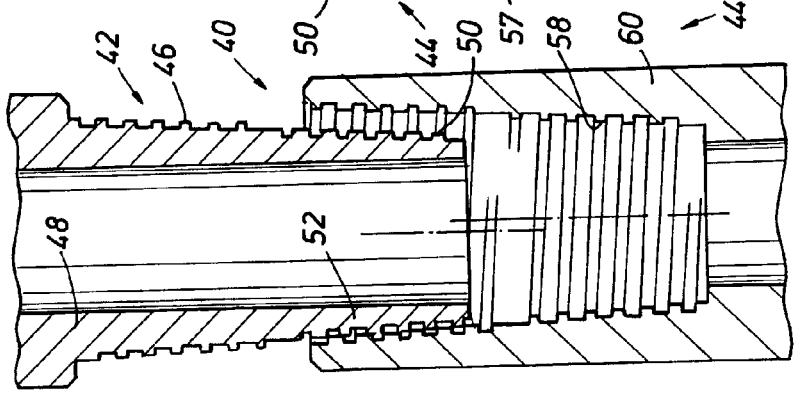
FIG. 6 is a vertical cross sectional view of the pin and box connection of FIGS. 4 and 5 illustrated with the pin and box threads engaging without hanging up midway through the destabbing process.

Thus, as illustrated in FIGS. 6 and 7, regardless of the relative axial positions of the pin and box, the thread tooth 50 cannot enter the gap 57 when the tooth and gap are radially aligned.

Thread hang-up between the smaller thread teeth 46 and the larger box grooves 57 is prevented when the pin thread 50 is engaged in the box thread 58. With the threads of the small step engaged, the pin 42 is centralized within the box 44, preventing contact between the large step threads of the pin and box. When the pin and box connections are free to move laterally relative to each other, during stabbing or destabbing, the crest or external surface of the thread tooth 50 will slide along the crest or external surface of the thread tooth 54 without any danger of the two thread teeth hanging together. This feature of the present invention minimizes the requirement for a stabbing guide and eliminates the requirement for a destabbing guide.

FIG. 8 of the Drawings illustrates the hang free feature of the present invention indicated generally at 70, applied to a typical hooked thread with non wedging thread teeth. The connection 70 includes a box indicated generally at 72 and a pin indicated generally at 74. A thread tooth 76, having a hook thread profile, is formed on the small step of the two-step pin connection 74. The thread tooth 76 has a thread width, measured axially along the connection, that is greater than a groove (root opening) 78 formed between adjacent turns of a thread tooth 82 formed on the large step of the box connection. The larger width of the pin tooth 76 prevents the tooth from entering the smaller dimensions of the root opening 78, thereby precluding hang-up of the pin and box threads during the destabbing and stabbing process.

FIG. 9 illustrates a typical positive flank thread, non-wedge type connection, indicated generally at 90, employing the no-hang principle of the present invention. The connection 90 includes a pin indicated generally at 92 and a box indicated generally at 94. A conventional positive flank thread tooth 96 is formed on the small step of the pin connection 92. A similar thread tooth 98 is formed on the large step of the box 94. A gap 100 between adjacent turns of the thread tooth 98 forms an opening that is smaller than the width of the pin tooth 96. The pin threads 96 are thereby prevented from entering into the gap 100 to preclude hanging up of the pin and box during stabbing and destabbing.

FIG. 10 illustrates a connector of the present invention, indicated generally at 110, with a two-step thread pin 112 being stabbed or destabbed within a matching box 114. The pin thread is formed with a multi-faceted thread tooth 116 on a small step 118 of the pin connection. A second multi-faceted thread tooth 120 is formed on a larger step 122 of the pin. The box 114 of the connection 110 is provided with multi-faceted thread teeth 124 and 126 on the large and small steps, respectively, of the connection.

Adjoining turns of the box thread tooth 124 define an increasing width groove 130 having an axial spacing or gap that, at any point axially along the length of the thread, is smaller than the axial width of the decreasing width pin tooth 116. Correspondingly, adjoining turns of the pin thread 116 define a gap 132 that has an axial spacing smaller than the axial width of the box tooth 124 at any place along the length of the tooth 124. The pin and box thread teeth form wedge threads with a full dovetail engagement.

As illustrated in FIG. 10, the dimensions of the gaps and thread teeth in the pin and box threads prevent the threads from hanging up in each other when they contact radially. When the pin and box of the connection 110 are made up, the engagement of the two small steps of the connection maintains the connection exactly centered so that the smaller pin thread tooth 120 cannot engage the larger grooves 130 in the box. Once the pin is moved into the stab or destab position, the dimensions of the opposing thread teeth and gaps between thread teeth prevent hang-up of the threads.

Figure 11:
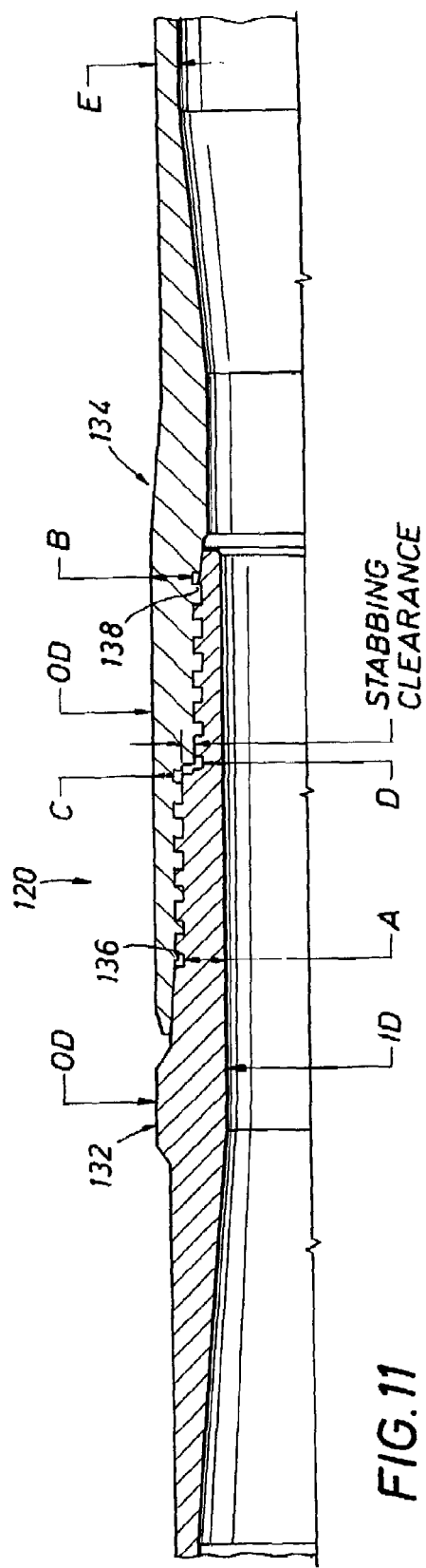
FIG. 11 is a vertical, quarter sectional view of a conventional two-step connection constructed with large spacings between two adjacent thread steps to reduce the incidence of thread hang-up.
Figure 12:
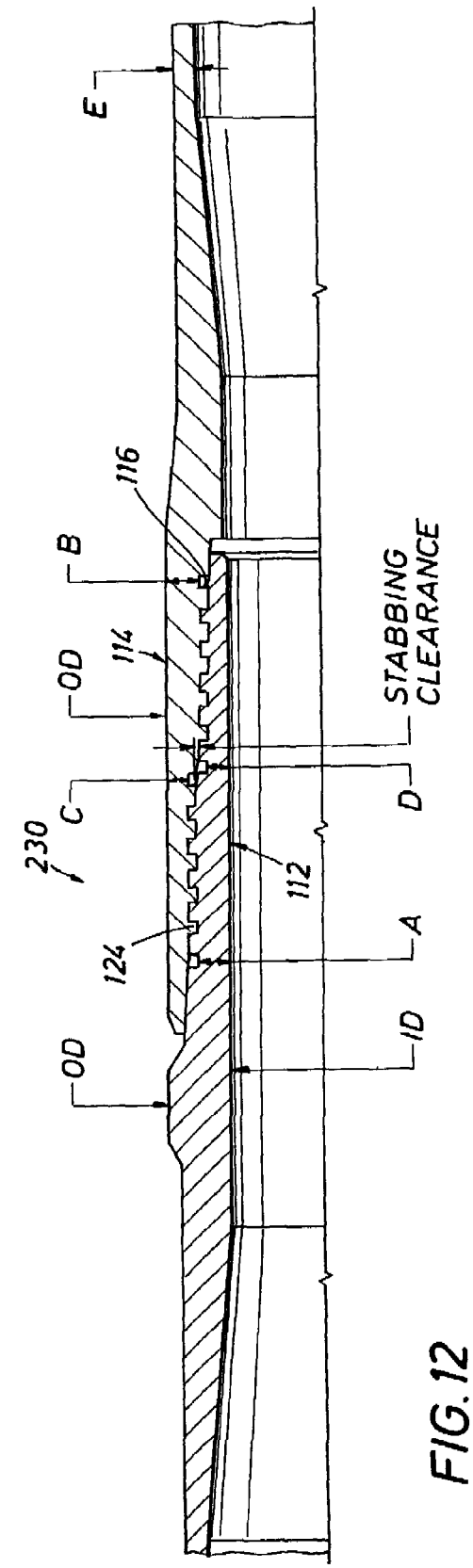
FIG. 12 is a vertical, quarter sectional view of a 2-step connection such as illustrated in FIG. 11 constructed in accordance with the teachings of the present invention.

FIG. 11 illustrates details in the construction of a conventional two-step, multi-faceted, dovetail wedge thread connection, indicated generally at 120. FIG. 12 illustrates a connector of the present invention, indicated generally at 230, constructed with a thread form such as that of the connection illustrated in FIG. 11, in which the teachings of the present invention have been applied to provide a non-hanging connection. The connection 230 is similar to the connection of FIG. 10 in its made-up position.

In determining the strength of a two-step, threaded connection, it is necessary to examine the amount of metal in four critical cross sectional areas. In a typical two-step connection, there are four different threads, two on the pin and two on the box. The critical cross sectional areas are at the ends of each of these threads. On the pin, each of the two critical cross sectional areas is taken in a plane at right angles to the pin axis, through the thread root to the Internal diameter of the connection. The critical areas for the box are taken in a similar fashion at the ends of the box threads; from the outside diameter of the box connection through the box thread roots. The surface area of the material of the connection at these critical areas determines the strength of the connection.

Where it is desired that the connection be at least as strong as the pipe body, i.e., a 100% connection, the thread will be cut on a pipe section having upset ends. In achieving a 100% connection, the material in the large step pin critical cross sectional area must be greater than the material in the pipe body cross sectional area. The area of the connection material in the box small step critical cross section must also be greater than the area of the material in the pipe body cross section.

Similarly, in achieving a 100% connection, the combined cross sectional area of the metal in the box small step and the pin large step must be larger than the cross sectional area of the metal in the pipe body. In such a connection, the area of the material in the box large step critical cross-section plus the area of the material in the pin small step critical cross section must be greater than the area of the material in the cross section of the pipe body. Ideally, the pin large step critical cross-section, the box small step critical cross section, and the combined areas of the pin small step critical cross section and the box large step critical cross-section should be equivalent for a balanced connection. The closer in size the box small step diameter is to the pin large step diameter, the better the connection.

The strength of a connection having the same outside diameter as of that of the pipe body, known generally as a "flush joint" connection, is also calculated in the same manner. Because of the limited amount of metal available for the formation of the pin and box threads, a full open flush joint connection is not normally capable of attaining a strength rating equal to that of the pipe body.

The previously described design considerations are illustrated as applied to the upset connector 120 of FIG. 11. The connector 120 is a TorqueLock (™) SIU connection for 2.875 inch pipe having a 0.217 in. radial pipe wall thickness. The connector 120 includes a pin member 132 engaged in a box member 134. Multi-faceted, dovetail, wedge threads are machined on the pipe upsets forming the pin and box portions of the connector. The large step and small step of the connection 120 differ in radial dimension by 0.120 in. to provide a suitable stabbing and destabbing clearance between the pin and box threads.

The strength and efficiency of the connector 120 are determined by evaluating the cross sectional areas of pipe material taken at four critical connection cross sectional areas indicated at A, B, C and D relative to the cross sectional area of the pipe body indicated at E. For purposes of convenience, the wall thicknesses of the pipe body and connections at the critical cross sectional areas will be used in describing the connection. If the connection 120 is to qualify to 100% of the tension rating of the pipe body, the pin wall at A must be thicker than the pipe wall at E, the box wall at B must be thicker than the pipe wall at E and the combined thickness of the box wall at C plus the pin wall at D must be greater than the thickness of the pipe wall at E. In the connection 120, the indicated components have the following conventional dimensions, listed in TABLE 1, under the heading "CONVENTIONAL," meeting the requirement for a joint having a connection as strong as the pipe body:

TABLE 1

|  | CONVENTIONAL | NO-HANG |
| --- | --- | --- |
| Outside diameter of pipe body, pin end: | 2.875 in. | 2.875 in. |
| Outside diameter of pipe body, box end: | 2.875 in. | 2.875 in. |
| Inside diameter of pin: | 1.700 in. | 1.876 in. |
| Outside diameter of box: | 3.125 in. | 3.125 in. |
| Outside diameter of pin: | 3.125 in. | 3.125 in. |
| Pin wall thickness at A: | 0.409 in. | 0.321 in. |
| Box wall thickness at B: | 0.418 in. | 0.330 in. |
| Box wall thickness at C: | 0.203 in. | 0.203 in. |
| Pin wall thickness at D: | 0.194 in. | 0.194 in. |
| Pipe wall thickness at E: | 0.217 in. | 0.217 in. |
| Combined pin and box wall at A: | 0.7125 in. | 0.6245 in. |
| Radial step difference: | 0.120 in. | 0.032 in. |

FIG. 12 illustrates the connector 230 of the present invention showing the dimensions and critical cross sectional areas at points corresponding to those depicted in the conventional connector 120 of FIG. 11. The connector 230 of FIG. 12 is the connector 110 of FIG. 10 illustrated in its engaged position. The various dimensions for the connector 230 are listed in TABLE 1 under the heading "NO-HANG".

In comparing compliance of the connector 230 with the design requirements noted previously, it will be appreciated that the connector 230 has a tension strength equal to at least 100% of that of the pipe bodies being joined by the connector. Thus, the wall dimensions at A and B are greater than the pipe wall dimension at E, and the combined pipe wall dimensions at C and D are greater than the wall dimension at E.

TABLE 1 also reveals that the connector 230 has a combined connector wall thickness that is less than that of the conventional connector 120 of FIG. 11. The combined wall section of the connector 230 contributes to the flexibility of the connector and reduces the incidence of fatigue failure. The connector 230 also has a greater central opening than the conventional connector 120 of FIG. 11. As a result, the connector 230 provides a reduction in the restriction to fluid flow and increases the central opening for improved entry of equipment and tools. All these features are realized in the connector of the present invention, with the included benefit of a no-hang capability during stabbing and destabbing of the connection.

Figure 13:
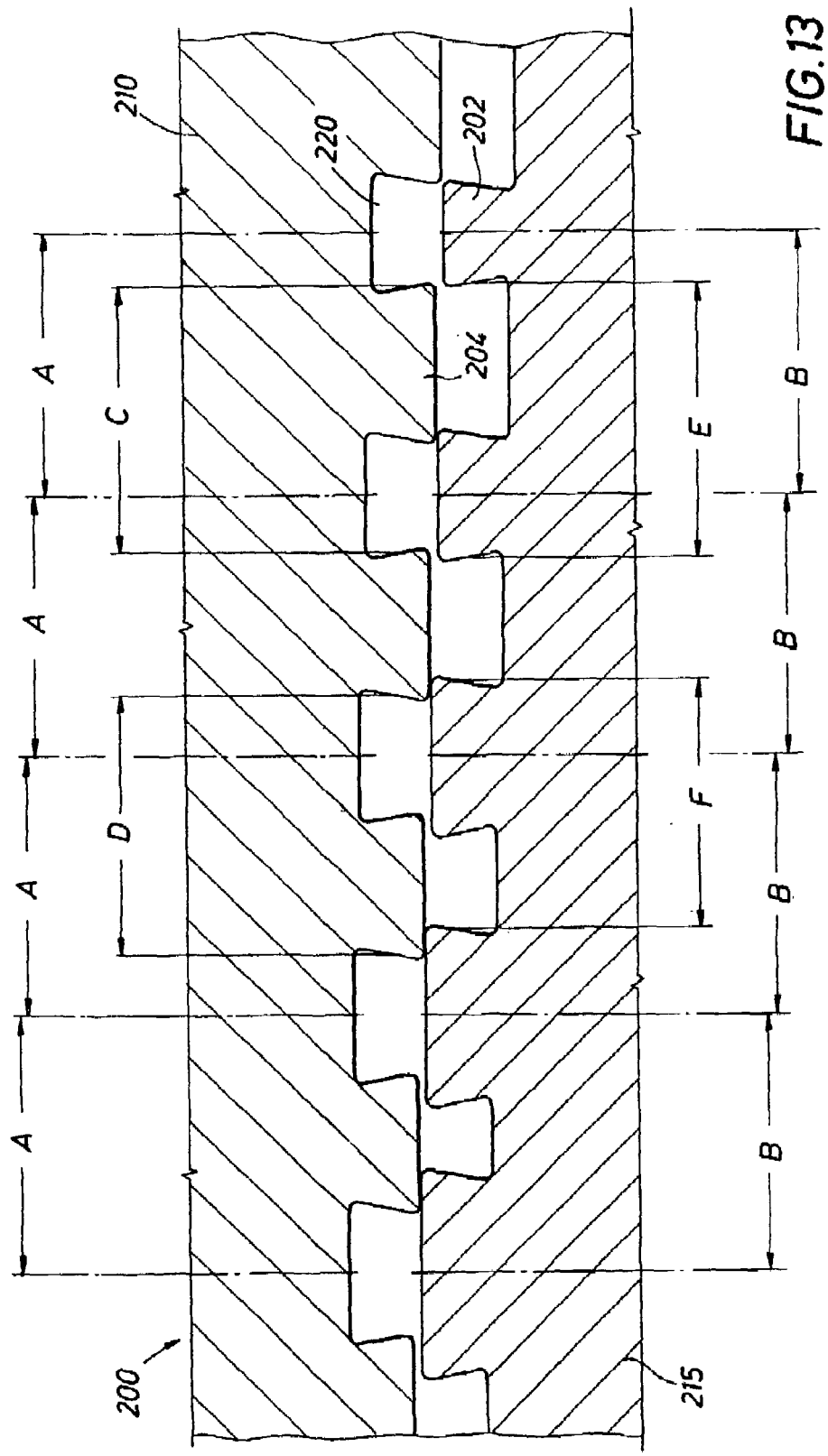
FIG. 13 is a an enlarged schematic representation of a wedge thread connection illustrating a large step of a box thread overlapping a small step of a pin thread wherein the pin and box threads have different leads to prevent thread hang-up.

FIG. 13, illustrates a modified form of a two-step dovetail wedge connection of the present invention, indicated generally at 200. The connection 200, illustrated in broken away cross sectional detail, depicts a small step pin tooth 202 and a large step box tooth 204. The large thread step of the box is indicated at 210 and the small thread step of the pin is indicated at 215.

The average lead of the box thread 204 is indicated as the dimension A. The average lead of the small step pin thread is shown as the dimension B. The lead between the load flanks of the box thread 204 is illustrated as the dimension C and the lead between the box thread stab flanks is illustrated as the dimension D. The dimension E depicts the load flank lead of the pin thread 202 and the dimension F depicts the stab flank lead of the pin thread. It is noted that, even though the tooth width of the pin thread is changing along the axial development of the thread, the average lead between adjacent thread turns remains unchanged. Similarly, the average lead of the changing width pin thread remains the same throughout its axial development. Since the average lead of the box thread is the same as the average lead of the pin thread, the pin and box components advance axially at the same rate as they are being threaded together.

As indicated in FIG. 13, the load flank lead of the pin thread is greater than the load flank lead of the box thread and the stab flank lead of the box thread is greater than the stab flank lead of the pin thread. The resulting differences in the dimensions and positions of the pin and box threads during stabbing and destabbing prevent the pin thread tooth 202 from entering the gap 220 between adjacent turns of the box thread tooth 204. The interference between the thread crests prevents the pin thread from entering the gap 220 except for the final turn of the pin thread adjacent the pin end.

Figure 14:
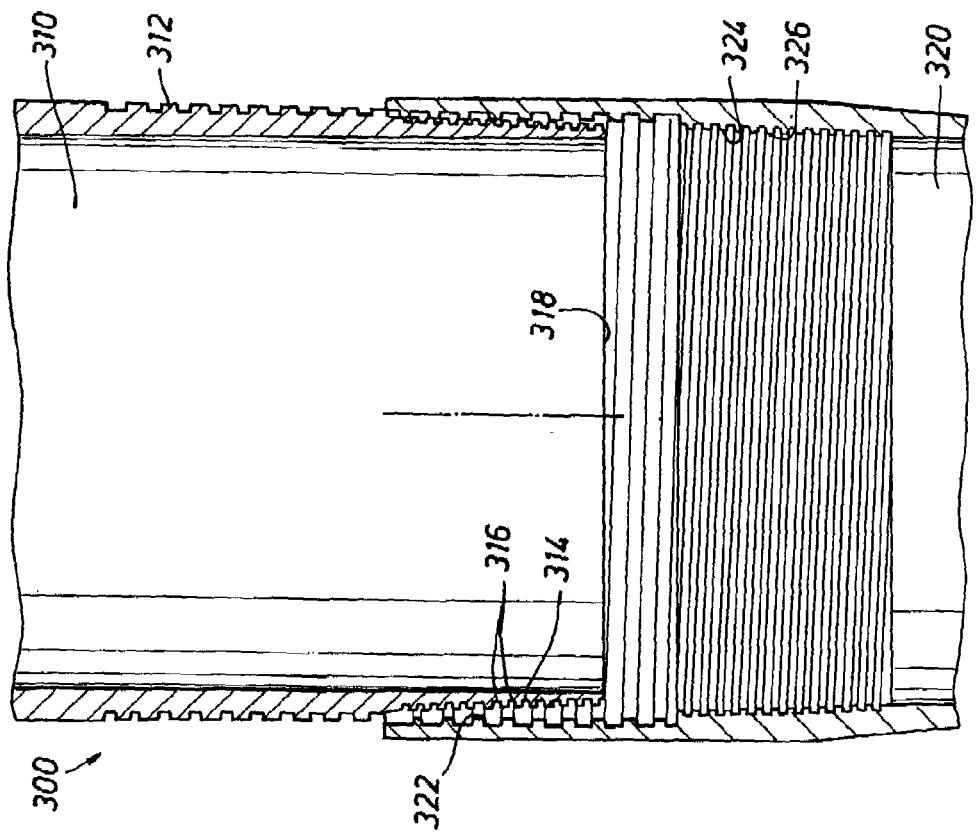
FIG. 14 is a vertical, sectional view of a two-step connection constructed with a parallel, double start thread on the small step and a wedge thread on the large step.

FIG. 14 of the drawings illustrates a form of the Invention, indicated generally at 300, in which hang up is prevented by providing different type threads on the small step and large step of the connection. A pin 310 is provided with a large thread step having a wedge thread tooth 312 extending helically along the external pin surface. Dual start, parallel thread teeth 314 and 316 extend helically over the external surface of a small step of the pin 310. The dual start thread teeth 314 and 316 begin adjacent a pin nose 318 and progress helically toward the large step of the pin, side-by-side, over the length of the small pin step. The thread tooth 314 begins adjacent the pin nose 318 and the thread tooth 316 begins one thread width away from the pin nose.

A Two-step box 320, designed to engage and threadedly connect to the pin 310, is provided with wedge threads 322 on the large step and parallel, dual start threads 324 and 326 on the box small step. FIG. 14 illustrates the connection 300 during the process of stabbing or destabbing the pin 310 into or out of the box 320.

During the stabbing or destabbing process of the connection 300, the crests of the dual start threads 314 and 316 span the gaps formed between the thread crests of adjacent turns of the box wedge thread tooth 322. Accordingly, any lateral displacement of the pin relative to the box during the stabbing and destabbing process engages the crests of the small pin thread teeth against the crest of the large box thread tooth to prevent hang-up.

Figure 15:
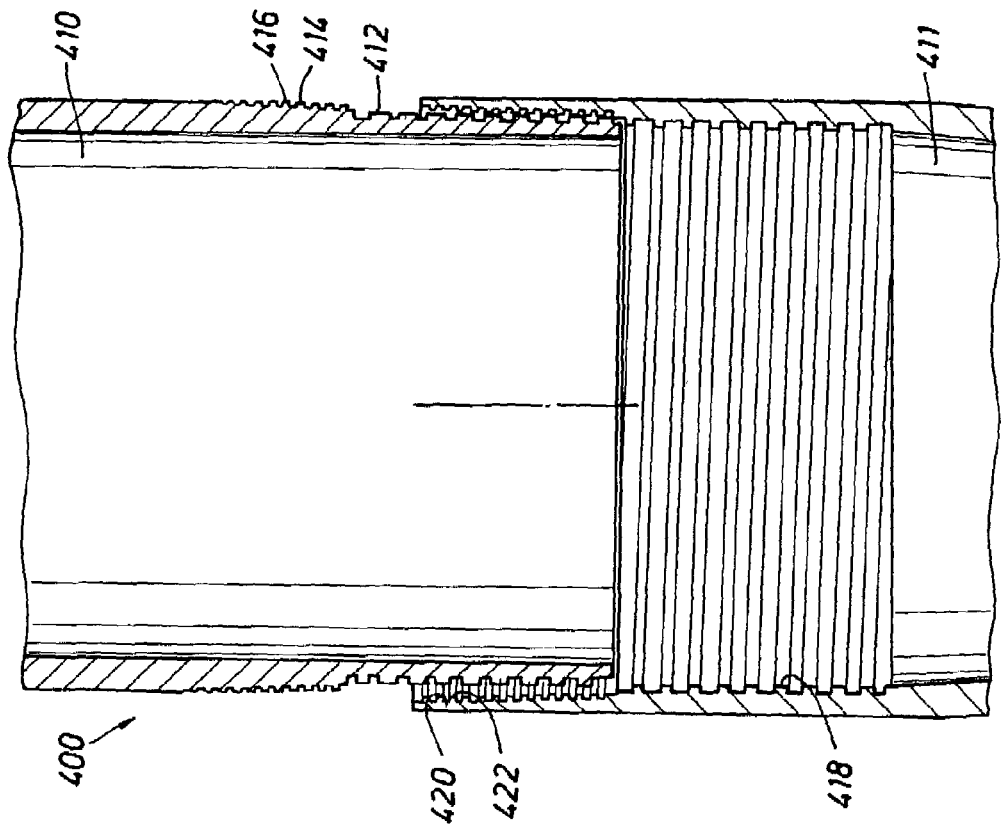
FIG. 15 is a vertical, sectional view of a two-step connection constructed with a wedge thread on the small step and a parallel, double start thread on the large step.

FIG. 15 illustrates a modified form of the Invention, indicated generally at 400, in which dissimilar threads are placed on the small and large steps of a multi-step connection to prevent hang-up of the connection during stabbing and destabbing. The connection is comprised of a two-step threaded pin 410 designed to mate with a correspondingly threaded box 411. The pin 410 is provided with a small step threaded area having a wedge thread tooth 412 extending helically over the external surface of the small step. Dual start, parallel thread teeth 414 and 416 are provided over the pin large step. The box 411 is provided with a helical thread tooth 418 extending over the box small step. Dual start, parallel thread teeth 420 and 422 extend over the internal surface of the box large step.

During stabbing and destabbing of the connection 400, the crests of the thread teeth 420 and 422 span the gap between crests of adjacent revolutions of the pin wedge thread tooth 412 to prevent hang-up.

The design and use of the Illustrated embodiments of the present invention have been set forth in detail in order that the invention may be clearly understood as it may be employed in applications and circumstances different from those anticipated in the preferred settings. The specific embodiments of the invention described herein are merely illustrative of the many and diverse forms that this invention may take, and of the many and diverse applications that this invention may have throughout industry in general. Accordingly, the foregoing description is not to be considered as limiting to the particular embodiments that have been illustrated and described. Rather, this invention is intended to be regarded broadly within the scope of the appropriate interpretation of the following claims.

What is claimed is:

1. A multi-step threaded tubular connection, comprising:
   a pin connector having a large diameter pin thread area and a smaller diameter pin thread area formed about a central pin axis,
   a box connector with a large diameter box thread area and a smaller diameter box thread area formed about a central box axis, said large diameter pin thread area being threadedly receivable within said large diameter box thread area and said smaller diameter pin thread area being threadedly receivable within said smaller diameter box thread area,
   a pin thread tooth coaxially formed externally on said smaller diameter pin thread area, said pin thread tooth advancing helically from one axial point on said pin connector toward a nearest axial end of said pin connector,
   a pin crests on said pin thread tooth, having a crest widths measured parallel to said pin axis,
   a box thread tooth coaxially formed internally on said large diameter box thread area, said box thread tooth advancing helically from one axial point on said box connector toward a nearest axial end of said box connector, and
   a box thread groove defined between adjacent helical segments of said box thread tooth, said box thread groove having a groove width measured parallel to said box axis the pin tooth crest nearest said nearest axial pin end cannot radially enter said box thread groove nearest said nearest axial end of said box connector sufficiently to hang-up said pin and box upon stabbing or destabbing of said pin.

2. A multi-step thread tubular connection as defined in claim 1 wherein the width of said pin thread tooth increases along the helical thread development in a direction away from said axial end of said pin.

3. A multi-step thread tubular connection as defined in claim 1 wherein pin and box thread teeth of said connection are adapted to engage in a wedge-thread.

4. A multi-step thread tubular connection as defined in claim 1 wherein pin and box thread teeth of said connection are adapted to engage in a hook thread.

5. A multi-step thread tubular connection as defined in claim 1 wherein pin and box thread teeth of said connection have cross sectional profiles with at least one thread flank of each thread being parallel with a thread flank of the other.

6. A multi-step thread tubular connection as defined in claim 1 wherein pin and box thread teeth of said connection are adapted to threadedly engage with each other in a dovetail connection.

7. A multi-step thread tubular connection as defined in claim 6 wherein pin and box thread teeth of said connection are adapted to engage in a wedge-thread.

8. A multi-step threaded tubular pin connector having first and second threaded areas, said first threaded area having a larger diameter than said second threaded area, comprising:
   a first pin thread tooth extending helically over said first threaded area,
   a second pin thread tooth extending helically over said second threaded area,
   said first tooth having first tooth crests positioned between a stab flanks and load flanks of said first tooth, and
   said second tooth having a second tooth crests positioned between a stab flank and a load flank of the second tooth crest with the smallest axial width being larger than the first tooth crest with the largest axial width.

9. A multi-step threaded tubular connector as defined in claim 8 wherein said first or said second pin thread tooth has a width that increases along the helical thread development in a direction away from a nearest axial end of said pin.

10. A multi-step threaded tubular box connector having first and second threaded areas, said first threaded area having a larger diameter than said second threaded area, comprising:
   a first thread tooth formed helically over said first threaded area defining a first thread groove between adjacent helical sections of said first thread tooth, and
   a second thread tooth formed helically over said second threaded area defining a second thread groove between adjacent helical sections of said second thread tooth, said second thread groove being wider at a point farthest from a near axial end of said connection than said first thread groove at a point nearest a said near axial end of said connector.

11. A multi-step threaded tubular box connector as defined in claim 10 wherein said first thread tooth has a width that increases along the helical thread development in a direction away from a nearest axial end of said box.

12. A multi-step threaded tubular box connector as defined in claim 10 wherein said first thread tooth comprises a wedge-thread.

13. A multi-step threaded tubular box connector as defined in claim 10 wherein one of said box thread teeth comprises a hook thread.

14. A multi-step threaded tubular box connector as defined in claim 10 wherein one of said box thread teeth has a cross sectional profile with parallel thread flanks.

15. A multi-step threaded tubular box connector as defined in claim 10 wherein one of said box thread teeth has a dovetail cross sectional thread profile.

16. A multi-step threaded tubular box connector as defined in claim 15 wherein one of said box thread teeth comprises a wedge-thread.

17. A multi-step threaded tubular box connector as defined in claim 10, further comprising:
   a central axis in said connector with said first and second thread teeth extending helically and axially along an inner surface of said box connector, said box teeth defining box thread grooves between adjacent helical sections of said thread teeth, said box thread grooves having widths that decrease in width in a direction away from a nearest axial end of said box connector.

18. A threaded connection having a pin and box adapted to be threadedly engaged with and disengaged from each other, comprising:
   a threaded pin having a helically extending pin thread tooth extending from a pin base area toward a pin end area in the vicinity of a near axial end of the pin, said pin thread tooth having a cross sectional area defined in part by a pin thread load flank, a pin thread stab flank and a pin thread crest extending between the pin thread load flank and the pin thread stab flank,
   a threaded box having a helically extending box thread tooth extending from a box base area toward a box end area in the vicinity of a near axial end of the box, said box thread tooth having a box thread crest defining a thread root entry space between adjacent box thread crests in helical sections of said box thread tooth, and
   said pin thread crest at a point nearest said near axial end of said pin having a width dimension measured axially along said pin, that is greater than a width dimension of a box thread root entry space, measured axially along said box, at a point nearest said near axial end of said box area.

19. A threaded tubular connection as defined in claim 18 wherein said pin thread tooth has a width that increases along the helical thread development in a direction away from the near axial end of said pin.

20. A threaded tubular connection as defined in claim 18 further comprising pin and box threads having cross sectional thread forms in the configurations of either V, tapered, square, round, dovetail, wedge, chevron, semi-dovetail, multifaceted or combinations of such configurations.

21. A threaded tubular connection as defined in claim 20 further comprising pin and box thread teeth adapted to engage and form a hook thread.

22. A threaded tubular connection as defined in claim 20 wherein said pin and box thread teeth have cross sectional profiles with at least one thread flank of each thread tooth being parallel with a thread flank of the thread tooth.

23. A threaded connection as defined in claim 20 further comprising pin and box thread teeth adapted to threadedly engage each other in a dovetail connection.

24. A threaded tubular connection as defined in claim 23 further comprising pin and box thread teeth adapted to engage in a wedge-thread connection.

25. Multiple crested pin thread teeth extending helically around an axially extending tubular body from a base point on said tubular body toward a termination point in the vicinity of a nearest axial end on said tubular body wherein the pin crest at a point nearest said termination point is wider than the pin crest at a point nearest said base point.

26. A multi-step threaded tubular connection, comprising:
   a pin connector having a large diameter pin thread area and a smaller diameter pin thread area formed about a central pin axis,
   a box connector with a large diameter box thread area and a smaller diameter box thread area formed about a central box axis, said large diameter pin thread area being threadedly receivable within said large diameter box thread area and said smaller diameter pin thread area being threadedly receivable within said smaller diameter box thread area,
   a pin thread tooth coaxially formed externally on said smaller diameter pin thread area, said pin thread tooth advancing helically from one axial point on said pin connector toward a nearest axial end of said pin connector,
   pin crests on said pin thread tooth, said pin crest having a crest width measured parallel to said pin axis,
   a box thread tooth coaxially formed internally on said large diameter box thread area, said box thread tooth advancing helically from one axial point on said box connector toward a nearest axial end of said box connector, and
   said pin thread tooth on said smaller diameter pin area having a cross sectional profile different from the cross sectional profile of said box crest on said larger diameter box thread area whereby said pin thread tooth cannot hang-up in the spacing between any of the adjacent turns of a box thread tooth.

27. A multi-step threaded tubular connection as defined in claim 26 wherein said smaller diameter pin thread area includes a pin thread tooth having a wedge thread profile and said larger diameter box thread area includes a box thread tooth having a parallel thread profile.

28. A multi-step threaded tubular connection as defined in claim 26 wherein said a smaller diameter pin thread area includes a pin thread tooth having a parallel thread profile and said larger diameter box thread area includes a box thread tooth having a wedge thread profile.

29. A multi-step threaded tubular connection as defined in claim 27 further comprising a dual start, parallel thread teeth on said larger diameter box thread area.

30. A multi-step threaded tubular connection as defined in claim to 28 further comprising a dual start, parallel thread tooth on said smaller diameter pin thread area.

* * * * *

UNITED STATES PATENT AND TRADEMARK OFFICE
CERTIFICATE OF CORRECTION

| | |
|---|---|
| PATENT NO. | : 7,007,984 B2 |
| APPLICATION NO. | : 10/301079 |
| DATED | : March 7, 2006 |
| INVENTOR(S) | : Kris L. Church |

It is certified that error appears in the above-identified patent and that said Letters Patent is hereby corrected as shown below:

Column 12, line 21, delete "a pin crest" and insert therefor --pin crests--.

Column 12, line 21, delete "a crest widths" and insert therefor --crest widths--.

Column 12, line 32, delete "said" and insert therefor --the--.

Column 12, line 65, delete "a stab flanks" and insert therefor --stab flanks--.

Column 12, line 66, delete "a second tooth crests" and insert therefor --second tooth crests--.

Column 12, line 67, delete "a stab flank and a load flank" and insert therefor --stab flanks and load flanks--.

Column 13, line 1, after "tooth" insert therefor --, the second tooth--.

Column 13, line 18, delete "connetion" and insert therefor --connector--.

Column 13, line 19, delete "a said" and insert therefor --said--.

Column 13, line 49, after "threaded" insert therefor --tubular--.

Column 14, line 20, after "threaded" insert therefor --tubular--.

Column 14, line 48, after "pin thread tooth," delete --said pin crest--.

Column 14, line 49, delete " a crest width" and insert therefor --crest widths--.

Column 14, line 58, delete "thread tooth" and insert therefor --crest--.

Column 14, line 60, delete "a box" and insert therefor --said box--.

UNITED STATES PATENT AND TRADEMARK OFFICE
CERTIFICATE OF CORRECTION

PATENT NO. : 7,007,984 B2
APPLICATION NO. : 10/301079
DATED : March 7, 2006
INVENTOR(S) : Kris L. Church It is certified that error appears in the above-identified patent and that said Letters Patent is hereby corrected as shown below:

Column 15, line 5, delete "teeth" and insert therefor --tooth--.

Signed and Sealed this

Twenty-eighth Day of August, 2007

JON W. DUDAS
*Director of the United States Patent and Trademark Office*